Dec. 26, 1967  W. H. FRENCH  3,360,531
IN SITU EPOXIDATION PROCESS
Filed Oct. 6, 1964
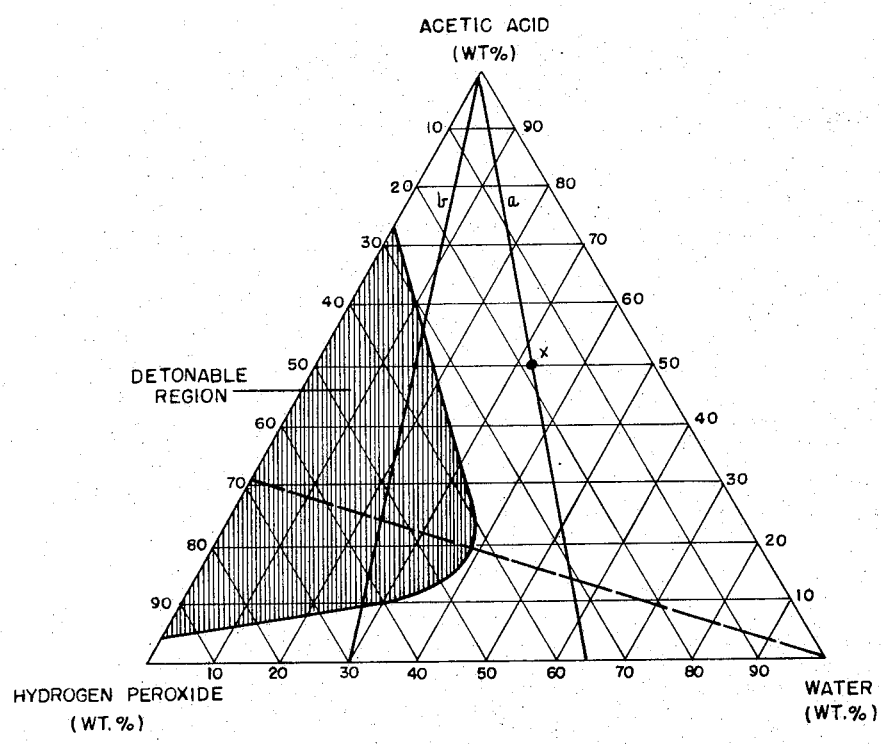
INVENTOR
WILLIAM H. FRENCH
BY CECIL C. SCHMIDT
PATENT AGENT

# United States Patent Office 3,360,531
Patented Dec. 26, 1967

3,360,531
IN SITU EPOXIDATION PROCESS
William H. French, St. Paul, Minn., assignor to Ashland Oil & Refining Company, Ashland, Ky., a corporation of Kentucky
Filed Oct. 6, 1964, Ser. No. 401,921
15 Claims. (Cl. 260—348.5)

ABSTRACT OF THE DISCLOSURE

Epoxidizable materials are epoxidized by in situ formed peracetic acid in a process which allows the use of aqueous hydrogen peroxide having concentrations of 60 to 90% through the following steps:

(1) Forming a first mixture of an epoxidizable compound and acetic acid, and
(2) Slowly adding aqueous hydrogen peroxide and an acid catalyst to the first mixture at an epoxidation temperature, said peroxide and said catalyst being added over a period of at least 30 minutes while agitating the first mixture.

Disclosure

The present invention relates to the reaction of unsaturated organic compounds with peracids to produce epoxides. In another aspect, the present invention relates to an improved process for epoxidizing fatty acid esters of mono- and poly-hydric alcohols with peracetic acid (formed in situ) wherein the order and manner of addition of the reactants is controlled in a predetermined manner.

The reaction in which an oxygen atom is introduced into a compound containing an unsaturated carbon-to-carbon bond to form a three-membered ring is termed epoxidation. The products of epoxidation reactions are termed epoxides. They are also called oxirane compounds, ethylene oxides, or 1,2-epoxy compounds. Compounds produced by the epoxidation of acetylenic materials, termed oxirene compounds, are rare and difficult to produce.

The discovery of the reaction of olefins with peracids has been generally credited to the Russian chemist, Prileschajew. The preparation and characterization of epoxides were described by Berthelot, Wurtz, and Reboul, as early as 1861. More recently, epoxides have received increased attention because of their usefulness, both as chemical intermediates and as end-products. Because of the strained three-membered ring (called an epoxy group), epoxides are among the more reactive of the oxides, and they are far more reactive than ordinary ethers. While open-chain ether linkages are characteristically inert to many reagents, epoxides react with almost all nucleophilic substances. Ring openings, accompanied by the formation of addition compounds, occurs upon treatment with halogen acids, sulfonic acids, bisulfites, carboxylic acids and anhydrides, hydrogen, water, alcohols, amines, aldehydes, and a number of other materials.

It is because of this reactivity of epoxy groups that these compounds have become commercially important. Epoxy groups are seldom found in natural products, although they are produced by the auto-oxidation of unsaturated fatty acids and drying oils. They may also occur as intermediates in some biological reactions. In organic synthesis, epoxides have found use as chemical reagents in the manufacture of fine chemicals, surface active agents, special solvents, plasticizers, dyes, cosmetics, synthetic resins, cements and adhesives. Increasing numbers of epoxides are finding use as end-products. For example, ethylene oxide is used as an insecticidal fumigant; glycidyl ethers have been employed as film forming materials, as special solvents, and as stabilizers for chlorinated organic compounds; and epoxidized oils and fatty esters are finding increasing use as plasticizers and stabilizers for plastic materials.

While epoxides may be prepared by several different methods, the present invention is intimately concerned with one particular method, i.e., the reaction of an epoxidizable unsaturated organic compound with peracetic acid, the latter being formed in situ. Since peracetic acid is easily prepared and is inexpensively made, its use and application in epoxidation reactions have been extensively studied. The work of Swern, Findley, and Scanlon and their co-workers at the research laboratories of the Department of Agriculture has contributed significantly to the determination of the reaction conditions best suited for the efficient conversion of ethylenic compounds to epoxides. More recently Hansen and Sedgwick, in U.S. 3,051,729, have described further improvements in this area. See also Hydrogen Peroxide in Epoxidation and Hydroxylation Reactions, published by the Shell Chemical Corporation, SC:57–25.

When used in epoxidation reactions, peracetic acid can be pre-formed or formed in situ by the reaction of aqueous hydrogen peroxide (e.g., 35 weight percent $H_2O_2$) with acetic acid (e.g., glacial acetic acid) in the presence of a small amount of a liquid acid catalyst (e.g., concentrated sulfuric acid).

Peracetic epoxidation is sometimes carried out in situ by first forming a mixture of aqueous hydrogen peroxide, acetic acid, and the unsaturated compound to be epoxidized (e.g., soybean oil), in a reaction zone. Without agitation, this mixture separates into two distinct phases, an aqueous phase and an organic phase. To this mixture is then added a small amount of a liquid acid, e.g., sulfuric acid (often this acid mixed with a small amount of acetic acid), which acts as a catalyst in forming peracetic acid in situ. This technique, while effective, has been demonstrated to be extremely dangerous, especially when attempts are made to use high concentrations of aqueous hydrogen peroxide (e.g., above 50 weight percent $H_2O_2$), since the resulting aqueous phase is frequently in a detonable region. Explosion hazards are minimized while the two phases are intimately mixed, as during the epoxidation reaction. However, when the two phases are allowed to separate, either by intent or by accident, the aqueous phase can present serious hazards in terms of explosion susceptibility.

A more common technique, currently in use, is to first add the aqueous hydrogen peroxide directly to the olefinic compound to be epoxidized. Then the acetic and sulfuric acids are added to the mixture over an extended period of time. This technique is ordinarily considered to be a more preferred commercial technique, but here again, marginal safety conditions are frequently encountered, and the use of high peroxide concentrations is not possible. By "high" or "low" peroxide concentrations, as the terms are used herein, it is intended to refer to the concentration of the aqueous hydrogen peroxide, per se.

In a further prior art variation, the acids (acetic and sulfuric) have been first added to the unsaturated compound to be epoxidized, and then the peroxide was added gradually. This procedure is undesirable since excessive side reactions occur and discoloration of the reaction mixture is noted, even in the early stages of the epoxidation.

A still further prior art technique has been to make a pre-formed peracetic acid (which is actually an equilibrium mixture of, for example, acetic acid, peracetic acid, hydrogen peroxide, sulfuric acid and water). This pre-formed peracetic acid is then reacted with the olefinic compound to be epoxidized. This procedure presents the problem of storage and handling of the pre-formed peracetic acid, which must often be held at room temperature for periods up to twenty-four hours. This can be dangerous from the standpoint of fire and explosion hazards, as well as a nuisance from the standpoint of storage and handling.

The real and potential dangers that accompany the use of hydrogen peroxide, when mixed with organic compounds, has been appreciated for some time and has been the subject of intense investigations. See, for example, Concentrated Hydrogen Peroxide, Summary of Research Rata on Safety Limitations, published by the Shell Chemical Corporation, SC:59–44. By way of example, the accompanying drawing is a ternary diagram which sets forth currently available explosion data on the system hydrogen peroxide/water/acetic acid at 25° C. The data are represented by an experimentally determined explosion boundary which corresponds well with one calculated from theoretical considerations using a critical excess energy of 450 cal./gm. The stoichiometric line (dotted) represents those mixtures of hydrogen peroxide and acetic acid that are needed for complete reaction to carbon dioxide and water. The diagram demonstrates how the explosive area (i.e., the detonable region) for this simple ternary system surrounds the composition ratios of $H_2O_2$ and acetic acid that leads to complete reaction to carbon dioxide and water. Explosions are generally unobtainable when such a ternary mixture contains less than 30 weight percent hydrogen peroxide. These data allow for excellent *estimates* of potential explosion hazards of new systems, although experimental safety data must always be obtained for a new system whenever the safety of personnel or equipment is concerned.

Because of the sensitivity of hydrogen peroxide-containing solutions, those skilled in the epoxidation art have generally employed aqueous hydrogen peroxide, per se, at concentrations of 50 weight percent or less, e.g., 40 weight percent or even 30 weight percent, so as to avoid forming epoxidation reaction mixtures that might be even slightly sensitive. An understanding of this healthy respect for the particular system involved can be obtained by reference to the following illustrations made with reference to the drawing. If one starts with glacial acetic acid and adds 35 weight percent aqueous hydrogen peroxide, the composition of the system progresses from the upper apex of the ternary diagram along line *a*. A mixture of 50 parts of acetic acid and 50 parts of 35 weight percent aqueous hydrogen peroxide is represented by point *x* which is well within the area of probable safety. Compositions formed in the same manner from glacial acetic acid and 70 weight percent aqueous hydrogen peroxide fall along line *b*. Note that with 35 weight percent hydrogen peroxide, it is not possible to enter the known detonable region for this ternary system, but with 70 weight percent hydrogen peroxide, much of the range of compositions formed is within this area.

A solution whose composition is in the detonable area will not necessarily detonate, especially if no source of initiation energy is available, although it should be mentioned that certain mixtures containing hydrogen peroxide have been found to detonate without the usual requirement for an external source of initiation energy.

The sensitivity of explosive hydrogen peroxide mixtures is of the same order of magnitude as that for molten TNT or nitroglycerine. Oxygen deficient mixtures or water rich mixtures are less sensitive (e.g., less sensitive to mechanical impact) than are oxygen balanced or oxygen rich mixtures. Explosions can be initiated by mechanical shock, explosive shock, heat, electrical discharges, hot surfaces, etc. The United States Bureau of Mines has calculated that the explosive energy released by the complete decomposition of 90 weight percent aqueous hydrogen peroxide to form water and oxygen would be about 39% of the energy released from an equal weight of TNT. This represents a huge source of potential energy when one realizes that a single, large, commercial, batch expoxidation reaction may involve over 8,000 pounds of aqueous hydrogen peroxide.

It has now been discovered, and this discovery forms a basis for the present invention, that the order and manner of addition of the necessary reactants is considerably more important than had previously been thought. It has been discovered that if *both* the aqueous hydrogen peroxide and the liquid acid catalyst (e.g., sulfuric acid) are slowly added, separately or as a mixture, to an already formed mixture of acetic acid and the compound to be epoxidized (with or without a solvent), numerous unexpected advantages accrue. One feature of the present process is the added safety involved. The addition of hydrogen peroxide can be halted at any time. By following the sequence of process steps as taught herein, hydrogen peroxide is consumed (i.e., converted to peracetic acid and water) as it is slowly added to the acetic acid/olefinic compound mixture. This peracetic acid immediately begins to react with the unsaturation present in the olefinic compound. The present inventor has observed that when aqueous hydrogen peroxide is kept separate from organic compounds (i.e., separate from the olefinic compound, acetic acid, and organic solvent), the likelihood of explosion or fire is minimal. Consequently, by practicing the process described herein, explosive mixtures of hydrogen peroxide and organic material are substantially avoided. If, in addition, the acid catalyst, e.g., sulfuric acid, is also kept separate from the organic materials and then added at a slow rate, significantly less product discoloration results. There also appears to be some interaction that allows higher aqueous peroxide concentration to be used than has heretofore been thought possible. This appears to be a direct consequence of keeping the peroxide separate from the organic materials and an indirect consequence of keeping the acid catalyst, e.g., sulfuric acid, separate. When aqueous hydrogen peroxide and sulfuric acid are pre-mixed before the slow addition begins, an added benefit accrues in that the sulfuric acid seems to stabilize the peroxide. Additionally, the presence of a proper catalytic amount of sulfuric acid is facilitated.

The epoxidized materials produced by this improxed process have high oxirane values, low iodine values, and very good color. Minimum side reactions are involved. Significantly less sulfating results than in the prior art methods wherein the sulfuric acid was present in the reaction mixture and aqueous hydrogen peroxide was then added. Moreover, reaction times can be significantly reduced. Product quality is improved when the present process is used, even when the lower conventional peroxide concentrations (e.g., 50 weight percent) are employed.

Another feature of the present invention is that aqueous hydrogen peroxide may be used at higher concentrations than has heretofore been thought possible for in situ epoxidation, from a safety standpoint. As previously indicated, much of the prior art has employed aqueous hydrogen peroxide at concentrations generally falling between about 30 and 50 weight percent to avoid the detonable region. Use of higher peroxide concentrations, in the prior art processes, is generally considered to be very dangerous since the aqueous phase is often in a detonable region. However, by employing the present order and manner of addition, it has been found that it is possible to employ aqueous hydrogen peroxide concentrations of up to 75 weight percent or even up to 90 weight percent, without exceeding acceptable safety limits. Generally, the concentration of aqueous hydrogen peroxide will be above 60 weight percent, and preferably above 65 weight percent. Aqueous hydrogen peroxide concentrations of about 70 weight percent have been shown by the present inventor to be extremely useful. The range of concentrations of from 65–75 weight percent represents the optimum. At aqueous hydrogen peroxide concentrations of from 65–75 weight percent, reaction times are minimized without encountering the disadvantageous side reactions frequently encountered at very high (e.g., 90 weight percent) aqueous hydrogen peroxide concentrations.

The reaction times involved strongly favor the use of the higher concentrations of aqueous hydrogen peroxide. By way of example, to achieve about the same degree of epoxidation, it takes about 12 hours for the herein described one-step 70 weight percent aqueous hydrogen peroxide epoxidation, and about 21 hours for a conventional 50 weight percent aqueous hydrogen peroxide two-step epoxidation as described in U.S. 3,051,729. Obviously, when higher peroxide concentrations are employed, it is not necessary to handle as much volume of material as is presently handled. Consequently, the out-put of desired product is increased on a "per batch" basis.

A further feature of the present invention is the discovery that, although the present process may be conducted with or without a solvent, the use of a solvent (e.g., a paraffinic hydrocarbon such as heptane) with the higher peroxide concentrations results in a higher quality epoxide product. Higher oxirane content and better heat stability of the epoxide products result from such a use of a solvent. By way of example, using 70 weight percent aqueous hydrogen peroxide, a product with a 6.68% oxirane content (by weight) was obtained from soybean oil without a solvent and 6.95% oxirane content was obtained with a solvent (all other conditions remaining substantially identical). Excellent results (from the standpoint of safety, cost and product quality) have been obtained when 70 weight percent aqueous hydrogen peroxide was mixed with a catalytic amount of concentrated sulfuric acid and the resulting mixture slowly added to a mixture of epoxidizable fatty oil, glacial acetic acid, and paraffinic hydrocarbon solvent. An epoxidized soybean oil containing 7.00 weight percent oxirane and good heat stability has been produced in this manner.

The preferred peroxide/sulfuric acid mixtures of the present invention contain rather small amounts of sulfuric acid (e.g., about 2%) and may corrode conventional equipment. Where corrosion is not a problem, the hydrogen peroxide and sulfuric acid can be pre-mixed and then added at a later time to the oil and acetic acid. Alternately, the peroxide and sulfuric acid can be mixed immediately before addition. One way of accomplishing this is to continuously mix the aqueous hydrogen peroxide and sulfuric acid in a mixing zone (e.g., a small stainless steel chamber) at the top of a reaction zone (e.g., an autoclave) and allow the mixture to immediately pass to the reaction zone. Also, as previously indicated, the acid catalyst, e.g., sulfuric acid (alone or mixed with a small amount of acetic acid, e.g., up to 10%, or 25%, or even 35% of the total acetic acid used in the epoxidation reaction), can be added simultaneously with, but separate from the aqueous hydrogen peroxide.

The rate of aqueous hydrogen peroxide addition to the acetic acid/epoxidizable compound mixture may vary over a considerable range, depending upon the size of reaction vessel, degree of agitation, cooling capacity, etc. This addition may be continuous, or it may be incremental. If desired, the peroxide and/or acid catalyst may be injected into different parts of the reaction zone (containing acetic acid and epoxidizable compound) or into different reaction zones where a plurality of zones have been used. It is desirable that the amount of aqueous hydrogen peroxide added in any one increment be kept below 25% of the total peroxide to be employed. Preferably, this amount will be below 20 weight percent, e.g., below 15 weight percent. Increments of 5% and 10% have been successfully used.

One technique that can be used quite effectively is to first add 2–15 weight percent, e.g., 5–10 weight percent, of the total aqueous hydrogen peroxide to be used in the epoxidation reaction, to the mixture of acetic acid and epoxidizable compound (with or without a solvent). The resulting mixture is then allowed to equilibrate (usually at reaction temperature of 120°–150° F.) for a short period of time, e.g., 10 minutes to 2 hours, preferably 20 to 40 minutes, e.g., 30 minutes. Agitation of this mixture is maintained. A corresponding portion of the acid catalyst, e.g., sulfuric acid, is added at the same time. As previously indicated, this can be accomplished by separate addition, by addition as a mixture with a small portion of acetic acid, or, more preferably, in admixture with the aqueous hydrogen peroxide. After this initial period of equilibration, the remaining hydrogen peroxide and sulfuric acid are slowly added to the epoxidation reaction mixture. Preferably, this addition is at a uniform rate, either continuously or in numerous small increments. When incremental addition is employed, a total of at least 4 increments should be used. Preferably, at least 10 increments, e.g., 25 or more increments, should be used. Incremental addition that approaches continuous addition is very desirable. The addition of the remaining aqueous hydrogen peroxide (which will always be at least 75% of the total peroxide employed) and sulfuric acid should desirably extend over a period of at least one-half hour. Runs have shown that less than one-half hour for the *total* peroxide addition is not usually slow enough. Consequently, caution should be used when attempting to add the total amount of highly concentrated aqueous hydrogen peroxide (e.g., 70 weight percent) over a period shorter than one-half hour. Preferably, the total addition is stretched out over a period of at least 45 minutes, e.g., about 60 minutes. More preferably, a total period of at least 90 minutes is employed when this split addition technique is used. During this same time, a proper catalytic amount of acid catalyst, e.g., sulfuric acid, should also be added. This addition of sulfuric acid is done simultaneously with the peroxide addition, e.g., an increment of peroxide and a proportionate increment of sulfuric acid.

The preferred technique is to immediately begin the slow addition of peroxide without first adding the initial increment and waiting for equilibration as previously referred to. In this situation, the peroxide and acid catalyst, e.g., sulfuric acid, are added slowly (e.g., dropwise) over the same extended period of time, i.e., over at least 30 minutes, preferably over at least 45 minutes, e.g., about 60 minutes. A slow, uniform rate of addition is the best. The reaction mixture should be continuously mixed during peroxide addition. Slower addition should ordinarily be used when more highly concentrated peroxide is used.

With any of the inventive techniques just described, use of current commercial plant equipment favors the use of longer periods of peroxide addition (i.e., slower addition). Periods of at least 1½ hours and, more preferably, at least 2 hours (e.g., 2½ hours) have been found to be preferred because of limitations in cooling capacity (the epoxidation reaction is exothermic and generally requires cooling).

The epoxidation reaction is exothermic and the ordinary procedure is to charge all or the major portion of the acetic acid (e.g., glacial acetic acid) and all of the epoxidizable material (e.g., soybean oil) to a reaction vessel, add the epoxidizing materials in the order and manner herein described, control the reaction temperature within the range of 120°–150° F., e.g., 130°–140° F., and agitate the reaction mixture. Agitation is usually maintained during the peroxide addition and the subsequent reaction periods. After a suitable period of time has elapsed and the desired product has been produced, e.g., 15 hours, the epoxidized product is recovered. The reaction time and temperature are related to the physical and chemical properties of the compounds to be epoxidized and to the properties desired in the ultimate product. Reaction times of up to 20, or even 30 hours, may be used. Ordinarily, reaction times of from 6–20 hours will be used. Usually, the reaction is continued until the iodine value of the epoxidizable material is reduced below 10, e.g., below 6.

As previously indicated, the present invention is concerned with an improved process for preparing epoxidized materials wherein the peracetic acid is formed in situ. Accordingly, the present invention is applicable to all known organic compounds which are conventionally epoxidized with peracetic acid. Thus, non-conjugated, mono- and polyunsaturated compounds (which may be substituted or unsubstituted) may be used. These compounds, all possessing ethylenic unsaturation, may be aliphatic or cycloaliphatic in nature. Preferably, this unsaturation is internal.

Numerous epoxidizable compounds, characteristically possessing the group:

are known to those skilled in the art and proper selection of epoxidizable compounds is well within their skill. One need only select compounds having an epoxidizable ethylenic unsaturation. Quite obviously, the substituents present in the epoxidizable compound should be those that have no significant adverse effect on the desired results. Thus, the present process is applicable to epoxidizable compounds containing unsaturated carbon-to-carbon linkages, which compounds are selected from the group consisting of epoxidizable mono- and poly-unsaturated, substituted and unsubstituted, straight and branched aliphatic carbon chains, cyclic and polycyclic aliphatic carbon chains and epoxidizable mixtures, and polymers and copolymers of said aliphatic and cycloaliphatic compounds. Of particular importance as preferred starting materials are the fatty compounds, i.e., compounds containing at least one aliphatic unsaturated hydrocarbon chain of 6 to 26 carbons, preferably 10 to 24 carbons. Such compounds include the fatty esters, fatty amides and fatty acids. Of particular importance are the alcohol esters of unsaturated higher fatty acids containing from 10 to 24, e.g., 12 to 22 carbon atoms. Such higher fatty acids include, for example, oleic acid, linoleic acid, ricinoleic acid, linolenic acid, erucic acid, myristoleic acid and the like. While these acids can be substituted, it is preferred that they be unsubstituted, i.e., that they only contain carbon and hydrogen in addition to the carboxy function. The alcoholic portion of these preferred esters will generally contain from 1 to 26 carbon atoms, and can contain one or more hydroxyl groups (before esterification). Such alcohols can be saturated or unsaturated and will preferably contain from 1 to 10 carbon atoms. Although the alcohols can be substituted, it is preferred that they contain only carbon and hydrogen in addition to the hydroxy function. Suitable alcohols include methyl alcohol, butyl alcohol, iso-octyl alcohol, long chain fatty alcohols derived from the corresponding fatty acids, ethylene glycol, glycerol, pentaerythritol, inositol and the like. Mixtures of epoxidizable compounds may be used, e.g., natural glycerides (an especially preferred class of materials) ordinarily exist as mixtures. Mono-hydric alcohol esters of unsaturated fatty acids are especially well suited for certain purposes.

The liquid acid catalysts useful in the present invention include sulfuric acid (usually as a concentrated aqueous solution, e.g., above 80 weight percent, preferably above 90 weight percent sulfuric acid) and the lower alkyl sulfonic acids, e.g., $C_1$–$C_4$ alkyl sulfonic acids. Methane sulfonic acid is particularly desirable. Mixtures of catalysts may be used, especially mixtures of the lower alkyl sulfonic acids. Concentrated sulfuric acid is the preferred catalyst.

Acetic acid is preferably employed as glacial acetic acid. However, less concentrated aqueous solutions of acetic acid can also be used. Less preferably, acetic anhydride can be used.

The solvents that are useful are the inert solvents, i.e., inert under these epoxidizing conditions. Suitable solvents include non-epoxidizable solvents such as the aliphatic hydrocarbons (e.g., heptane and octane), aromatic and cycloaliphatic hydrocarbons (e.g., toluene, xylene and cyclohexane) and the like, as well as mixtures thereof. Use of a solvent is preferred. Ordinarily, the amount of solvent used will be from 5 to 40 weight percent, e.g., 10 to 30 weight percent, of the material to be epoxidized. Some solvents work better than others with a given epoxidizable compound. For example, straight and branched chain paraffinic hydrocarbons (e.g., heptane and octane) work extremely well with soybean oil, while the aromatic solvents (e.g. toluene) give the best results when epoxidizing linseed oil. Thus, it is not meant to imply that all solvents work equally well with all epoxidizable compounds. They do not.

The proportions of the reactants to be employed and the necessary reaction conditions, as well as suitable product recovery techniques, are all well known. See, for example, U.S. 3,051,729, U.S. 2,458,484, the Shell Publication SC:57-25 previously referred to, U.S. 2,801,253 and Ser. No. 670,386, filed July 8, 1957 (reported at 141 USPQ 803). These references are incorporated herein by reference. However, the following proportions, etc., are provided as a convenience to the reader. Unless otherwise indicated, all proportions given in the following paragraph refer to the pure compounds, per se (i.e. 100% concentrations).

It is common to use from 0.7 to 1.3 moles of $H_2O_2$ per mole of ethylenic unsaturation in the epoxidizable compound. In the present process, it is preferred that an excess of peroxide be used. A preferred amount is from 1.05 to 1.25 moles of $H_2O_2$, e.g., 1.1 moles of $H_2O_2$ per mole of unsaturation. The amount of acetic acid used will usually be from 0.15 to 0.8 mole per mole of unsaturation. A preferred amount is from 0.25 to 0.6 mole of acetic acid. The amount of acid catalyst, e.g., sulfuric acid, will generally range from 2 to 10% by weight of the acetic acid. A preferred range is from 4.5 to 7.5 weight percent. Alternatively, the amount of sulfuric acid used is sometimes calculated as weight percent of the compound to be epoxidized. In such cases, the amount used will often range from 0.3 to 1 weight percent, e.g., 0.4 to 0.7 weight percent.

The present invention is further illustrated by the following specific examples which include a preferred embodiment. Unless otherwise indicated, all parts are by weight and all percentages are weight percentages.

*Example 1*

Four hundred parts of a commercially available soybean oil (Superb) having an iodine value of 135 (2.13 moles of ethylenic unsaturation) were mixed in a reaction vessel with 100 parts of commercial grade heptane (as a solvent) and 42 parts of glacial acetic acid (99.7% pure). This corresponds to 0.33 mole of acetic acid per mole of unsaturation. This mixture was heated to from 133° to 135° F. and maintained at that temperature while mixing. 2.25 parts of concentrated sulfuric acid (96.5% pure), amounting to 5.36% of the acetic acid present (0.56 weight percent of the epoxidizable soybean oil), were added to 113.9 parts of 70 weight percent aqueous hydrogen peroxide and mixed. The amount of peroxide used represents 1.1 moles of peroxide per mole of unsaturation in the soybean oil (i.e., a 10 mole percent excess of hydrogen peroxide). The peroxide/sulfuric acid mixture was then added dropwise to the oil-containing mixture at a uniform rate over a period of one hour with agitation of the reaction mixture. The reaction which ensued was exothermic and cooling was required to keep the temperature at 133° to 135° F. After a total of 11½ hours had elapsed, the iodine value had dropped below 6 and the reaction was stopped. The aqueous phase, which separated, was discarded. 0.4 part of $Ca(OH)_2$ was added to the oil phase to neutralize the sulfuric acid (which would otherwise cause discoloration, etc.). The oil phase was then steam stripped under 2 to 3 millimeters mercury absolute pressure up to a temperature of 225° F. The epoxidized oil product was then cooled and filtered. Color of the product was excellent, being below one on the Gardner scale. Oxirane content was 7.00%, iodine value was 3.7 and the viscosity was 3.8 stokes.

*Example 2*

The procedure described in Example 1 was repeated with the sole exception that 1.07 moles of hydrogen peroxide were used per mole of unsaturation. Product recovery was as described in Example 1. The oxirane content of the finished oil was 6.85%, and Gardner color was again below one.

Examples 1 and 2, just described, illustrate the beneficial features of preferred embodiments of the present invention. By utilizing a slow addition of both peroxide and sulfuric acid to the reaction mixture, the presence of explosive peroxide mixtures was substantially avoided. By this, it is meant that evaluations of this system have shown it to be as safe as currently employed conventional epoxidation techniques which are limited to significantly lower peroxide concentrations. Product quality, in terms of both color and oxirane content, is exceptional.

*Example 3*

The procedure of Example 1 is repeated using methane sulfonic acid as the catalyst. Product quality is again excellent.

*Example 4*

The procedure of Example 1 is repeated using n-hexyl oleate in place of the soybean oil. Product quality is again very good and no detonable compositions are encountered.

*Examples 5 and 6*

To further illustrate the present invention, linseed oil is epoxidized in the manner described in Example 1, using toluene as the solvent. In Example 5, 50 weight percent aqueous hydrogen peroxide is employed. In Example 6, 70 weight percent aqueous hydrogen peroxide is employed. The epoxidized products of both examples are of excellent quality.

To further illustrate the beneficial effects that are obtained when the sulfuric acid is kept separate from the organic phase and slowly added, simultaneously with the peroxide, a further epoxidation was carried out under the same conditions as outlined in Example 1. The same amounts of reactants were employed, but in this case all of the ingredients, including the sulfuric acid, but *excluding* the aqueous hydrogen peroxide, were first mixed. Then the peroxide, alone, was slowly added in the same manner as was previously done. The reaction was allowed to continue for 12¾ hours. Product recovery was identical to that described in Example 1. The resulting product had a Gardner color of 2 and an oxirane content of 5.93. The iodine value was 6.4 and the viscosity of the oily product was 4.4 stokes. The final product was too dark (by current commercial specifications that require a color of 1 or less), was significantly lower in oxirane and had a high iodine value. Thus, the product was poor. This illustration accents the interaction between sulfuric acid and hydrogen peroxide (shown in Examples 1 and 2). Note how oxirane content, for example, was lower even though the epoxidation was continued for a longer period of time.

Table I, which follows, summarizes and compares other data that were obtained when various processing techniques were employed in epoxidizing a commercially available soybean oil (Superb). The oil employed had an initial iodine value of 135.

TABLE I.—EPOXIDATION OF SOYBEAN OIL

| Run No. | Percent excess peroxide (mole percent) | Concentration of aqueous hydrogen peroxide (wt. percent) | Moles acetic acid per mole of unsaturation | Wt. percent H₂SO₄, based on oil weight | Wt. percent heptane, based on oil weight | Reaction time (hours) | Oxirane content (wt. percent) |
|---|---|---|---|---|---|---|---|
| 1 | 8 | *50 | 0.40 | 0.65 | None | 20½ | 6.85 |
| 2 | 10 | 70 | 0.20 | 0.64 | None | 11¼ | 6.68 |
| 3 | 10 | 70 | 0.30 | 0.51 | 20 | 12 | 6.93 |
| 4 | 7 | 70 | 0.33 | 0.56 | 20 | 13 | 6.87 |
| 5 | 10 | 70 | 0.30 | 0.48 | None | 12⅙ | 6.67 |
| 6 | 7 | 70 | 0.33 | 0.56 | 20 | 12¾ | 6.85 |
| 7 | 10 | 70 | 0.33 | 0.56 | 20 | 11½ | 7.00 |

| Run No. | Iodine value | Color (Gardner) | Viscosity (stokes) | Heat stability (after 2 hours at 350° F.) | | |
|---|---|---|---|---|---|---|
| | | | | Percent oxirane | Color (Gardner) | Viscosity (stokes) |
| 1 | 3.25 | 1— | 4.3 | | | |
| 2 | 2.06 | 3 | 4.3 | | Gelled | |
| 3 | 3.68 | 1— | 3.9 | | | |
| 4 | 4.2 | 1— | 4.0 | 6.81 | 3 | 4.1 |
| 5 | 5.6 | 1— | 4.4 | | | |
| 6 | 4.2 | 1— | 3.7 | 6.84 | 3 | 3.9 |
| 7 | 3.7 | 1— | 3.8 | 6.90 | 3 | 3.8 |

*2-step.

Run 1 was prepared in a conventional 2-step process. Fresh soybean oil was reacted with the "spent" aqueous layer (containing some peracetic acid) from a previous 50% peroxide epoxidation. This resulted in a partially epoxidized oil that was then separated from the aqueous phase and mixed with fresh aqueous hydrogen peroxide and most of the fresh acetic acid. Sulfuric acid was mixed with the remainder of the fresh acetic acid and this mixture was slowly added to the partially epoxidized oil. When epoxidation was complete, the "spent" aqueous layer was removed for use in the next batch. Product quality was excellent, but the reaction time was almost 21 hours. This is a fairly conventional process and is one with which any new process must inevitably be compared.

In Run 2, the oil, 70% of the hydrogen peroxide and 70% of the acetic acid were charged to a reactor. Sulfuric acid was mixed with the remainder of the acetic acid and slowly added to the oil. Then the remainder of the peroxide was added. The reaction mixture was in the detonable region and the product was poor, i.e., color was much too high and heat stability was totaly unacceptable.

In Run 3, a solvent was used while following the procedure of Run 2. Product quality improved significantly, but this process is in the detonable region and is considered unsafe for ordinary plant operations.

Run 4 was made in the manner of Run 3, using less peroxide, more acetic acid and more sulfuric acid. Product quality is good, but once again detonable compositions were encountered.

In Run 5 (illustrative of the present invention), all of the oil and acetic acid were charged to a reactor. The peroxide and sulfuric acid were mixed and slowly added (dropwise) to the oil over a period of 60 minutes. Product quality was good. This process is outside of the detonable region.

In Run 6, 7% excess peroxide was used and in Run 7, 10% excess peroxide was used. Both Runs were made in the same manner as Run 5, except that a solvent was used. Thus, they also illustrate the present invention. These runs were outside the detonable region and produced products of excellent quality. Note the tremendous amount of time saved in Runs 6 and 7 when contrasted with current practice (e.g., Run 1).

Thus, it can be appreciated that the present invention involves novel process innovations in the peracetic epoxidation of olefinic compounds. By employing the order of addition specified in this disclosure, it is possible to avoid the dangerous conditions encountered by prior art processes. In addition, the use of the present improved process allows higher peroxide concentrations to be employed than has heretofore been practical. Additionally, it is worthy of note that the use of a solvent such as heptane, in conjunction with the higher peroxide concentration and the order of processing as hereinbefore recited, produces epoxidized materials generally having higher oxirane values, lower iodine values, lower viscosities, and better colors, as well as better heat stability properties. Moreover, valuable processing time can be saved.

Having described the present invention with a certain degree of particularity, it will be realized that numerous minor changes and variations, falling within the spirit and scope of this invention, will become obvious to those skilled in the art. It is not intended that this invention be limited to any of the materials which have been mentioned as specific examples nor by the specific proportions which have been given for the sake of illustration, but it is intended to claim all novelty inherent in the invention, as well as all modifications and variations coming within the spirit and scope of the invention.

What is claimed is:

1. In a process for epoxidizing an epoxidizable compound characteristically possessing the group:

wherein said epoxidizable compound is epoxidized with peracetic acid and wherein said peracetic acid is formed in situ by the reaction of aqueous hydrogen peroxide with acetic acid in the presence of a liquid acid catalyst selected from the group consisting of sulfuric acid and lower alkyl sulfonic acids, the improvement which comprises the steps of:
   (a) forming a first mixture of said epoxidizable compound and acetic acid, and
   (b) then slowly adding said aqueous hydrogen peroxide having a hydrogen peroxide concentration of from 60 to 90% and said acid catalyst to said first mixture at an epoxidation temperature, said peroxide and said catalyst being added over a period of at least 30 minutes while agitating said first mixture.

2. A process as defined in claim 1 wherein said epoxidizable compound is fatty glyceride, wherein said acid catalyst is sulfuric acid, and wherein said aqueous hydrogen peroxide is used at a concentration of from 65–75 weight percent.

3. A process as defined in claim 1 wherein said acid catalyst and said aqueous hydrogen peroxide are added simultaneously and separately.

4. In a process for epoxidizing epoxidizable fatty compounds containing at least one unsaturated aliphatic hydro-carbon chain of 6 to 26 carbon atoms, wherein peracetic acid is used as the epoxidizing agent, said peracetic acid being formed in situ by the reaction of acetic acid and aqueous hydrogen peroxide with an acid catalyst selected from the group consisting of sulfuric acid and lower alkyl sulfonic acids, the improvement which comprises the steps of:
   (a) mixing said epoxidizable fatty compound with acetic acid and non-epoxidizable solvent,
   (b) heating said mixture to an epoxidizing temperature of from 120° to 150° F., and
   (c) slowly adding acid catalyst and aqueous hydrogen peroxide having a hydrogen peroxide concentration of from 60 to 90% to said heated mixture of epoxidizable fatty compound, acetic acid, and solvent over a period of at least 45 minutes.

5. An improved process of the type described in claim 4 wherein said epoxidizable fatty compound comprises fatty nitrile.

6. An improved process of the type described in claim 4 wherein said fatty compound comprises fatty glyceride, wherein said aqueous hydrogen peroxide is used at a concentration of from 65–75 weight percent, wherein said catalyst is sulfuric acid, and wherein said solvent is a hydrocarbon solvent.

7. A process of the type described in claim 6 wherein said temperature is from 130° to 140° F.

8. A process of the type described in claim 4 wherein said epoxidizable compound is soybean oil and wherein said solvent is a paraffinic hydrocarbon solvent.

9. A process of the type described in claim 4 wherein said epoxidizable compound is linseed oil and wherein said solvent is toluene.

10. In a process for epoxidizing an epoxidizable ester of unsaturated $C_6$–$C_{26}$ fatty acid with peracetic acid wherein said peracetic acid is formed in situ by the reaction of aqueous hydrogen peroxide with acetic acid in the presence of a catalytic amount of sulfuric acid, the improvement which comprises the steps of:
   (a) forming a first mixture comprising said ester and acetic acid,
   (b) forming a second mixture comprising aqueous hydrogen peroxide having a hydrogen peroxide concentration of from 60 to 90% and sulfuric acid, and
   (c) slowly adding said second mixture to said first mixture over a period of at least 45 minutes, said adding being done while said first mixture is agitated at an epoxidizing temperature.

11. A process of the type described in claim 10 wherein said ester is fatty acid ester of monohydric alcohol.

12. A process of the type described in claim 10 wherein said ester is fatty glyceride.

13. A process of the type described in claim 10 wherein said epoxidizable compound is soybean oil.

14. A process of the type described in claim 13 wherein said first mixture includes non-epoxidizable hydrocarbon solvent and wherein said aqueous hydrogen peroxide has a concentration of about 70 weight percent.

15. An improved process for epoxidizing soybean oil which comprises:
   (a) mixing 400 parts by weight of soybean oil with 100 parts by weight of heptane and 42 parts by weight of glacial acetic acid,
   (b) heating the resulting oil-containing mixture to 130° to 140° F.,
   (c) adding to said mixture a second mixture consisting essentially of a catalytic amount of concentrated sulfuric acid and an epoxdizing amount of 70 weight percent aqueous hydrogen peroxide,
   (d) said second mixture being added dropwise to said oil-containing mixture at a uniform rate over a period of at least one hour while maintaining said temperature at 130° to 140° F. and while agitating said oil-containing mixture,
   (e) continuing to maintain said temperature at 130° to 140° F. for a time sufficient to epoxidize said soybean oil and reduce the iodine value of said oil below 10, and (f) thereafter recovering epoxidized soybean oil.

References Cited

UNITED STATES PATENTS

| | | | |
|---|---|---|---|
| 2,774,774 | 12/1956 | Greenspan et al. | 260—348.5 |
| 3,177,227 | 4/1965 | Payne | 260—348.5 |
| 3,248,404 | 4/1966 | Werdelmann et al. | 260—348.5 |

FOREIGN PATENTS

| | | |
|---|---|---|
| 968,643 | 3/1958 | Germany. |
| 1,025,860 | 3/1958 | Germany. |
| 811,852 | 4/1949 | Great Britain. |

NORMA S. MILESTONE, *Primary Examiner.*